United States Patent
Fisher et al.

(10) Patent No.: US 10,618,724 B2
(45) Date of Patent: Apr. 14, 2020

(54) PROPPANT SYSTEM

(71) Applicant: PROPPANT EXPRESS SOLUTIONS, LLC, Denver, CO (US)

(72) Inventors: Marc Kevin Fisher, Castle Rock, CO (US); Ronald William Gusek, Denver, CO (US)

(73) Assignee: Proppant Express Solutions, LLC, Denver, CO (US)

( * ) Notice: Subject to any disclaimer, the term of this patent is extended or adjusted under 35 U.S.C. 154(b) by 0 days.

(21) Appl. No.: 15/455,796

(22) Filed: Mar. 10, 2017

(65) Prior Publication Data

US 2018/0257857 A1    Sep. 13, 2018

(51) Int. Cl.
  *B65D 88/30* (2006.01)
  *E21B 43/267* (2006.01)
  *B65D 90/34* (2006.01)
  *B65D 90/62* (2006.01)

(52) U.S. Cl.
  CPC ............. *B65D 88/30* (2013.01); *B65D 90/34* (2013.01); *B65D 90/623* (2013.01); *E21B 43/267* (2013.01)

(58) Field of Classification Search
  USPC ...... 294/68.21, 68.22, 68.26, 68.27; 414/414
  See application file for complete search history.

(56) References Cited

U.S. PATENT DOCUMENTS

| | | | | | |
|---|---|---|---|---|---|
| 3,220,612 | A | * | 11/1965 | Thomson | B65D 88/56 220/1.5 |
| 4,027,787 | A | * | 6/1977 | Bibeau | B65D 88/56 222/166 |
| 4,662,669 | A | * | 5/1987 | Erickson | B01J 8/0015 206/596 |
| 4,798,510 | A | * | 1/1989 | Lazenby | B65D 88/30 222/168 |
| 5,884,794 | A | * | 3/1999 | Calhoun | B65D 88/121 105/355 |
| 6,142,327 | A | * | 11/2000 | Riggio | B65D 88/128 206/596 |
| 2006/0289166 | A1 | * | 12/2006 | Stromquist | E21B 43/267 166/305.1 |
| 2014/0083554 | A1 | * | 3/2014 | Harris | B65D 88/32 141/1 |
| 2019/0002196 | A1 | * | 1/2019 | Lucas | B65D 88/30 |

* cited by examiner

*Primary Examiner* — Mark C Hageman
(74) *Attorney, Agent, or Firm* — Fennemore Craig, P.C

(57) ABSTRACT

A reusable proppant pod provides a containerized system for transport of oilfield proppant to a well location, and facilitates rapid discharge of the proppant in support of hydraulic fracturing operation. The proppant pod has a cylindrical sidewall, a top, and a frustoconical bottom that tapers towards a discharge gate. An external frame may be provided in rectilinear form to stabilize the proppant pod for road transport and to facilitate storage-stacking of a plurality of such proppant pods, one atop the other. The proppant pod is provided with fork lift tubes extending through the cylindrical sidewall. The proppant pod may have a solid top, in which case the proppant pod is inverted for filling operations that introduce proppant into the proppant pod through the discharge gate. A vent assembly is provided to facilitate entry of air during proppant discharge operations, where the vent assembly provides also a seal against proppant leakage during the inverted fill operation.

25 Claims, 12 Drawing Sheets

PROPPANT SYSTEM

BACKGROUND

1. Field

The present disclosure generally relates to oilfield containers for transporting, storing and distributing a proppant, such as sand, from a product source to a well site in support of a hydraulic fracturing operation. The containers allow a relatively large volume of proppant to be stored at a transport terminal or well site and subsequently distributed to the intended environment of use.

2. Description of the Related Art

Hydraulic fracturing operations are a well-known way of stimulating production from wells, especially oil and/or gas wells. Generally speaking, surface equipment is used to mix a hydraulic fracturing fluid that includes a liquid or gel mixed with a proppant. The hydraulic fracturing fluid is pumped down a wellbore at high pressure sufficient to fracture reservoir rock that contains the oil or gas. A liquid component of the hydraulic fracturing fluid drains away to leave proppant residing in the hydraulically induced fractures. This creates a more permeable flow pathway capable of accelerating production of the oil or gas.

Recent advances in horizontal drilling have created a significant increased demand for the hydraulic fracturing of wells where the zone of interest through reservoir rock may in some instances extend for over a mile. Large-scale hydraulic fracturing jobs may require several weeks to pump, and these jobs may consume tens of million pounds of proppant. The demands of these jobs for delivery of proppant may stress or overwhelm conventional proppant delivery systems.

United States Patent Publication 2014/03057692 to Eiden et al. advances the art by providing a conveyor sled assembly upon which are placed containers or pods filled with proppant. The pods discharge proppant onto the conveyor belt in a line where they drop their loads of sand. While improving the densification of proppant storage on a drilling location, the Eiden system lacks fully automated controls and the mechanism by which sand is delivered to the conveyor belt is subject to spillage. It is also difficult for a forklift operator to ascertain which containers have discharged all of their proppant so that replacement of the container on the conveyor sled is required. At a fracking well site, a fluid in which proppant is entrained is pumped through a well bore and to targeted regions to create "fractures" within the underlying hydrocarbon bearing formations.

Containers like those shown in Eiden are usually constructed with a rectilinear main storage compartment that drains into a hopper formed of four plates that are welded together and which descend towards a discharge gate. In practice, the use of flat plates for sidewalls forms a relatively weak structure that must be reinforced with extensive framework. A dimension of eight feet in width is frequently utilized because this is a common width for intermodal shipping containers, which lends itself well to railcars and over-the-road trailers.

SUMMARY

Then presently disclosed instrumentalities overcome the problems outlined above by providing a stronger, lighter proppant pod that is formed utilizing a cylindrical sidewall. The structure is advantageously stronger on a per unit weight basis and construction is simplified without materially adding to the areal footprint of the pods as they are stored.

According to one embodiment a proppant pod includes a cylindrical sidewall having a top end and a bottom end. A top enclosing the top end of the cylindrical sidewall. A frustoconical bottom covers the bottom end of the cylindrical sidewall. The cylindrical sidewall, top and frustoconical bottom collectively defining an interior space of the proppant pod. The frustoconical bottom is formed of a wall that tapers inwardly towards a discharge opening. A gate covers the discharge opening and is selectively positionable between an open configuration permitting proppant to flow through the discharge opening, and a closed configuration that prevents proppant from flowing through the discharge opening. The proppant container is provided with one or more elongate forklift pockets for lifting thereof. The proppant pod is constructed and arranged for withstanding stresses that inure from use providing proppant to facilitate a hydraulic fracturing operation.

In one aspect, the proppant pod may further include an exterior frame surrounding the proppant pod. The exterior frame provides stability against tipping during transport operations, as well as support for stacking one such proppant pod atop another.

In one aspect, the exterior frame may be constructed utilizing a plurality of horizontal members that form a rectilinear top and a rectilinear bottom connected by a plurality of upright posts. The rectilinear top and rectilinear bottom may be provided with complementary dimensions, such as rectangular or square dimensions, for stacking one of such proppant pod upon another. The rectilinear top may be provided with a plurality of pins and the rectilinear bottom with a plurality of receivers for these pins to facilitate secure stacking of one of such proppant pod upon another.

In one aspect, the proppant pod is provided with at least one motive means, such as a manually operated driver, a camming structure, a gearing arrangement, or an electric motor. The motive means is operatively coupled with the gate for selective positioning thereof between the open configuration and the closed configuration.

In one aspect, the gate may be a ladder gate, an iris gate or a clamshell gate.

In one aspect, a cross-bracing structure may stiffen the cylindrical sidewall by spanning the interior space. It is especially preferred that, where the forklift tubes run in parallel, each providing an axis of elongation, the cross-bracing structure includes at least one elongate cross-brace that runs substantially perpendicular to the axis of elongation in the fork lift tubes.

In one aspect, a vent assembly may be provided through the cylindrical sidewall to permit egress of air into and out of the interior space. The vent assembly is preferably positioned proximate the top of the proppant pod. The vent assembly may be constructed of wire mesh, or in other embodiments as a check valve. The check valve may have a clapper assembly that opens on an arc travelling away from the top. A rain bell may be operably positioned to mitigate entry of precipitation into the interior space through the vent opening.

In some embodiments, the top may include a hatch that may be locked and selectively opened to fill the interior space with proppant. Alternatively, the top may be a solid top constructed with sufficient strength to withstand a weight of proppant that is introduced into the interior space during an inverted fill operation.

The wall of the frustoconical bottom preferably rises at an angle from horizontal ranging from about 35° to 45° to facilitate gravity drainage of sand through the discharge opening.

The foregoing proppant pod may be utilized in a method of filling a proppant pod with proppant by use of a forklift equipped with forklift tongs and a rotary table for the forklift tongs. The method entails inserting the forklift tongs into the forklift tubes, lifting the proppant pod by raising the forklift tongs; inverting the proppant pod by rotation of the rotary table into a configuration such that the gate faces up; and opening the gate to permit passage of proppant therethrough. With the gate in the open configuration, proppant is introduced into the interior space of the proppant pod, then the gate is closed and the proppant pod is thereafter rotated into a configuration such that the gate faces down.

The foregoing proppant pod may be utilized in a method of hydraulic fracturing. This method entails filling the proppant pod, loading the filled proppant pod onto a first trailer for over-road transport; transporting the filled container on the first trailer to a well location where the proppant pod is unloaded from the first trailer. The proppant pods are optionally stacked one atop the other for storage at the well site location. A plurality of these proppant pods are placed onto a conveyor sled where they discharge proppant from the filled proppant pod onto the conveyor sled to provide proppant in support of a hydraulic fracturing operation until the proppant pods are empty. The empty proppant pods are then removed from the conveyor sled and placed onto a second trailer for removal from the well location.

BRIEF DESCRIPTION OF THE DRAWINGS

Illustrative and presently preferred exemplary embodiments of the invention are shown in the drawings in which:

FIG. 9 is a midsectional view of the proppant pod taken along line 4-4' of FIG. 6, but without the exterior frame, and as an embodiment including a top hatch used to fill the interior space of the proppant pod with proppant;

DETAILED DESCRIPTION

The presently disclosed instrumentalities teach by way of example and not by limitation. Therefore, what is shown and described should not be used unduly for purposes of limiting what is claimed.

Figure 1:
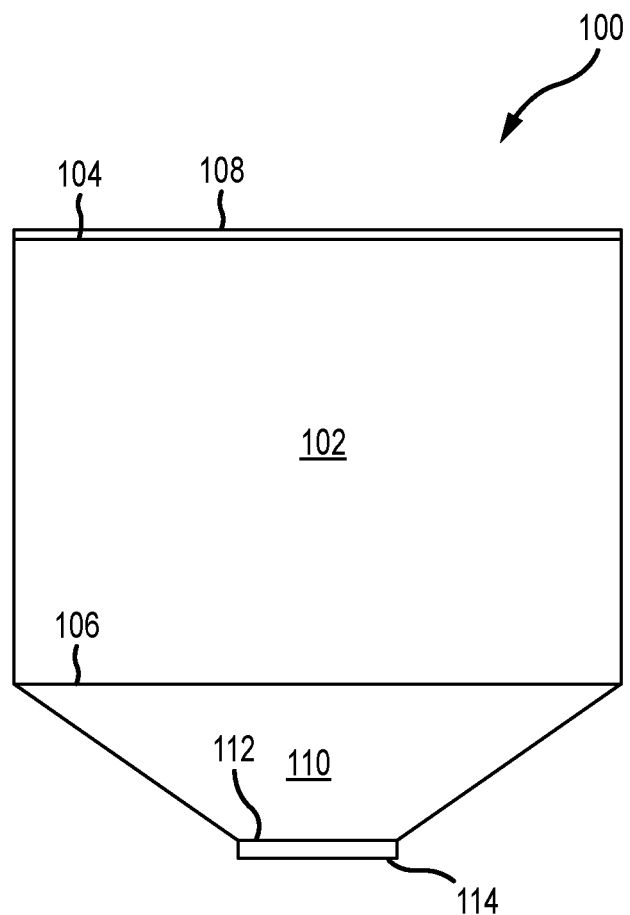
FIG. 1 is a side elevation view of a proppant pod of the present disclosure according to one embodiment.

FIG. 1 shows a right side view of proppant pod 100, the left side view being a mirror image thereof. A cylindrical sidewall 102 includes a top end 104 and a bottom end 106. A top 108 is welded to and encloses the top end 104. A frustcoconically shaped bottom 110 covers the bottom end 106, tapering towards a discharge opening 112 that is covered by gate 114. The gate 114 may be purchased on commercial order, for example, as a ladder gate, an iris gate, or a clamshell gate and, as needed, may be bolted onto an adapter flange (not shown) that is welded over the discharge opening 112. Collectively, the cylindrical sidewall 102, top 108 and bottom 110 define an interior space (not shown) within the proppant pod 100. This interior space may be filled with proppant, such as sand or ceramic proppant, that is used to facilitate a hydraulic fracturing operation.

Figure 2:
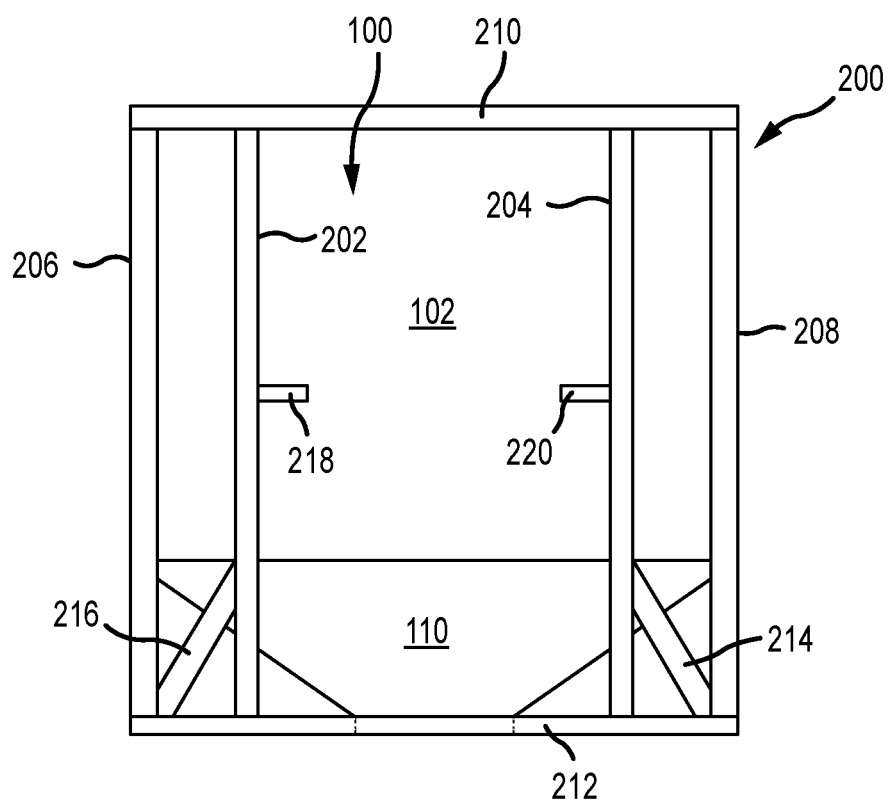
FIG. 2 is a front view of the proppant pod mounted within an exterior frame.

It will be appreciated that the structure of proppant pod 100 as shown on FIG. 1 is not well suited to stacking of such containers one upon the other. A frame may be utilized to facilitate stacking. FIG. 2 is a front showing the proppant pod 100 positioned within an exterior frame 200. The exterior frame 200 includes a plurality of upright frame members, such as upright members 202, 204, 206, 208, connecting horizontal frame members including horizontal members 210, 212. These members 202-212 may be suitably welded to the proppant container 100 at points of contact therewith. Slant members 214, 216 may extend between the various upright members 202-208 and/or horizontal members 214, 216 to provide bracing support as needed. One or more forklift tubes 218, 220 attach to the proppant pod 100 for lifting hereof. As shown in FIG. 2, the forklift tubes 218, 220 extend through the cylindrical sidewall 102. The forklift tubes 218, 220 are separated by a distance that accommodates one of the standard widths of forklift prongs. This distance may be, for example, 4, 5, 6 or 7 feet in width. It will be appreciated that the proportions of the proppant pod may change such that the cylindrical wall 102 has a smaller diameter, in which case the forklift tubes may be attached to the upright frame members 206, 208. As shown, the upright members 202, 204 are positioned to lend support to forklift tubes 218, 220.

Figure 3:
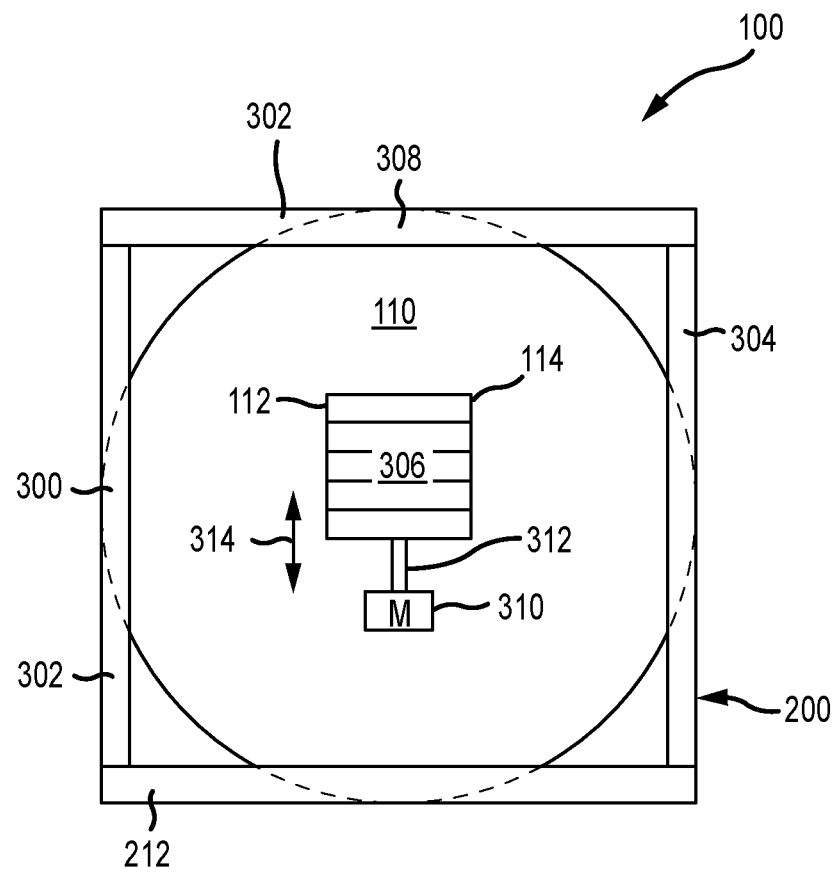
FIG. 3 is a bottom plan view of the proppant pod within the exterior frame.

FIG. 3 is a bottom view of the proppant pod 100 residing within the exterior frame 200. Additional horizontal members 300, 302, 304c\work in cooperation with horizontal member 212 to form a generally square support base such that the bottom 306 of gate 114 preferably does not extend below the lowermost face 308 of the exterior frame 200, and the bottom 306 is even more preferably at about the same elevation as the lowermost face 308. A motive means 310, such as a driver for a manually operated slide gate as described in copending application Ser. No. 15/264,328 filed Sep. 13, 2016, which is hereby incorporated by reference to the same extent as though fully replicated herein. The manually operated driver may be substituted, for example, by a camming arrangement or an electric motor. The motive means may also be a gearing arrangement, such as a rack and pinion system as described in copending application Ser. No. 15/264,352, also filed Sep. 13, 2016 which is hereby incorporated by reference to the same extent as though fully replicated herein. The motive means 310 engages mechanical linkage 312 for shifting 314 of the gate 114 between an open configuration that permits proppant to flow through opening 112 and a closed configuration that seals opening 112.

Figure 4:
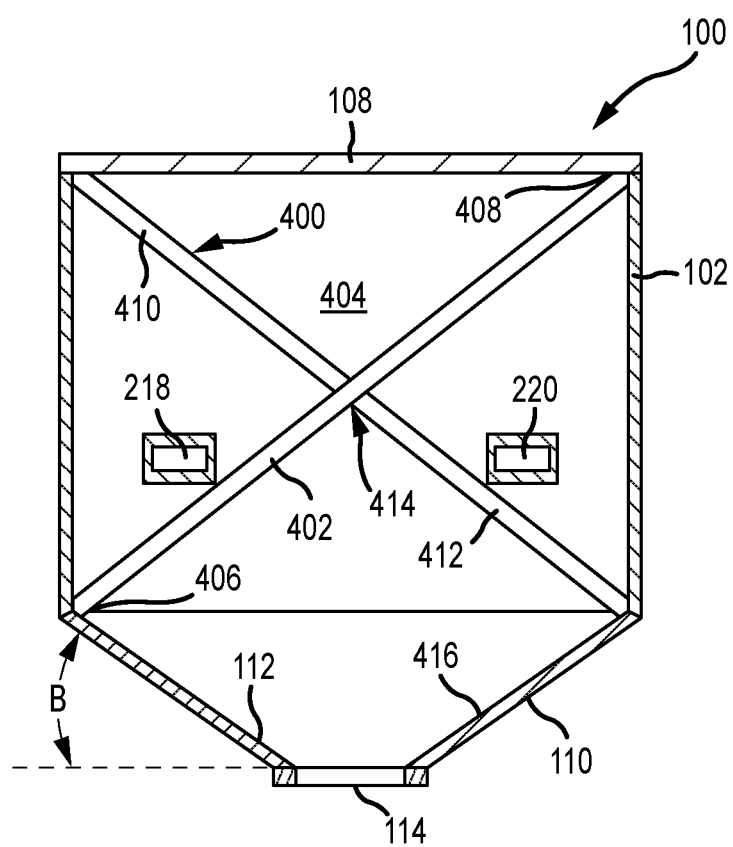
FIG. 4 is a midsectional view of the proppant pod taken along line 4-4' of FIG. 6, but without the exterior frame.
Figure 6:
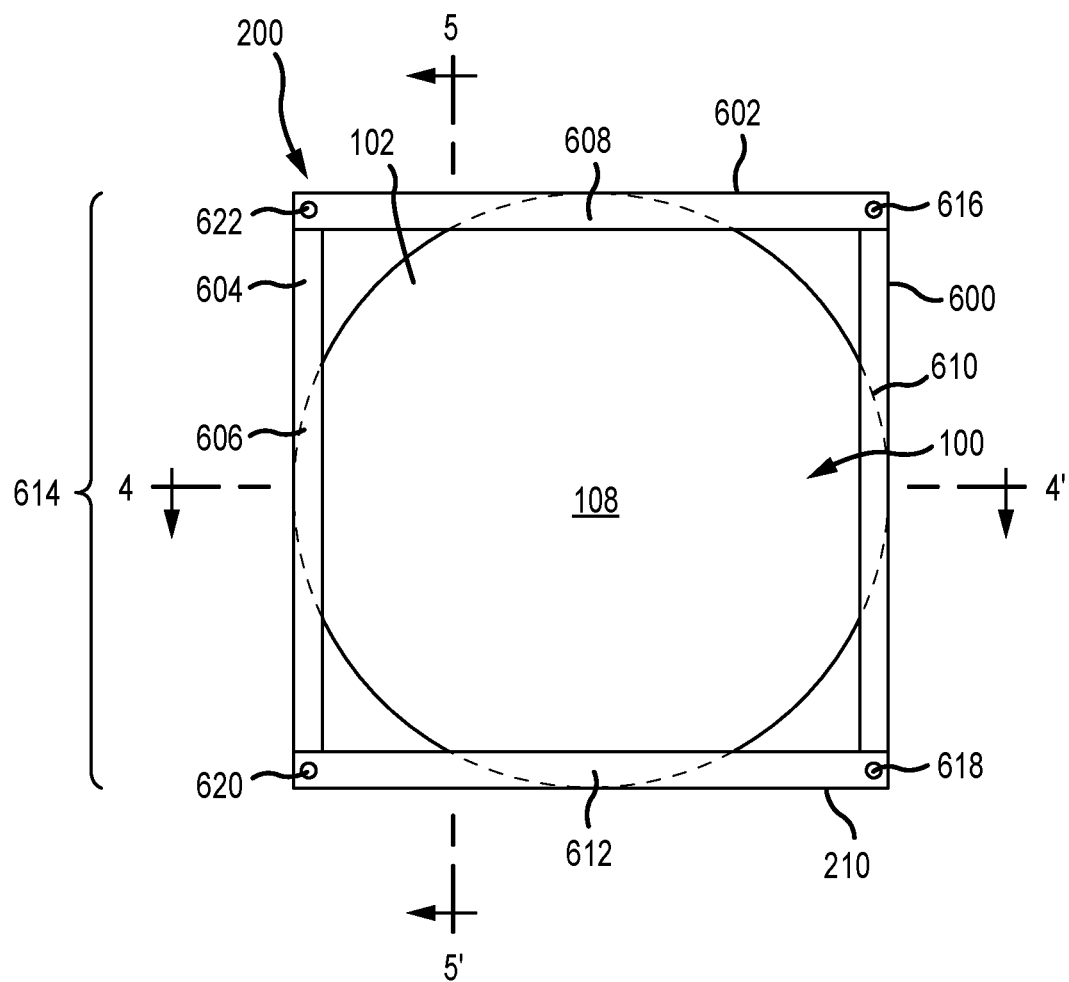
FIG. 6 is a top plan view of the proppant pod within the exterior frame.

FIG. 4 is a front midsectional view of the proppant pod 100, which is taken along line 4-4' of FIG. 6 but is shown separate and apart from the exterior frame 200. Cross-braces 4500. 402 span the interior space 404 of the proppant pod 100. The forklift tubes 218, 220 are elongate, extending through the cylindrical sidewall 102 with an axis of elongation (not see Fig.) that is generally perpendicular to the axis of elongation of the cross-braces 400, 402. The axis of elongation in cross-brace 402 extends, for example, from end 406 to end 408. This arrangement stiffens the cylindrical sidewall 102, especially as the proppant pod is pivoted on an axis (not shown) running parallel to the axis of elongation in the fork tubes 218, 220. It will be appreciated that the cross-brace 400 may be formed of an upper half 410 and a lower half 412 that are welded to cross-brace 400 at junction 414. The frustoconical bottom 110 may rise upwardly from horizontal at an angle β of at least about 35° relative to horizontal for fine sand and 42° for coarse sand. This angle is provided to assure gravity discharge of proppant along inner surface 416.

Figure 5:
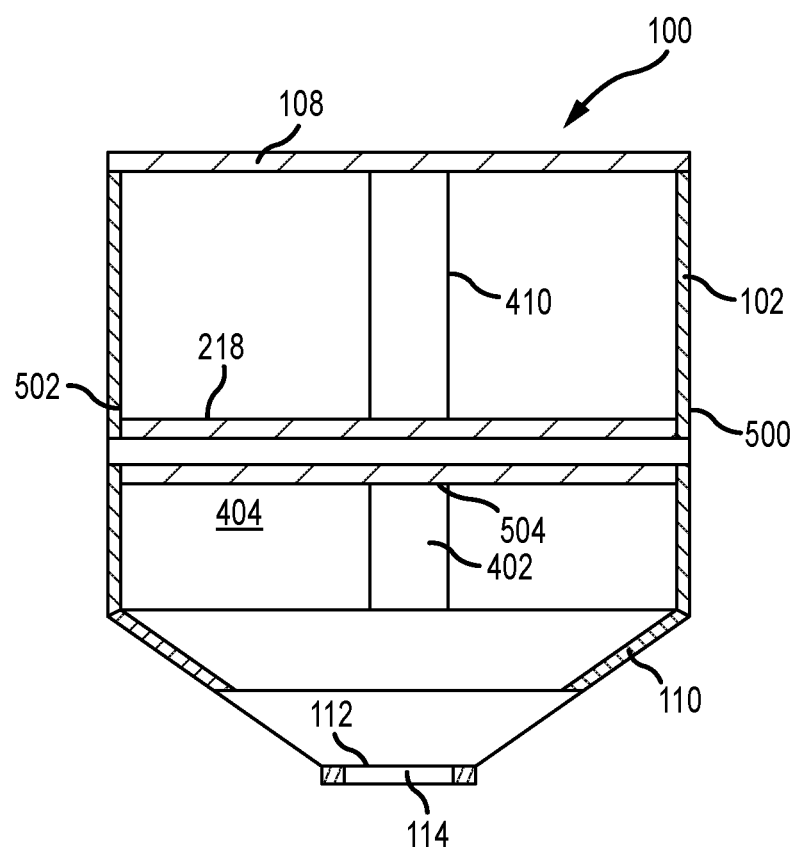
FIG. 5 is a midsectional view of the proppant pod taken along line 5-5" of FIG. 6, but without the exterior frame.

FIG. 5 is a side midsectional view taken along line 5-5' of FIG. 6. Fork tube 218 presents an axis of elongation extending through the cylindrical sidewall 102 from front entrance 500 to rear entrance 502. The forklift tube 218 may be welded to the cylindrical sidewall 102 at entrances 500, 502 and may be welded to cross-brace 402 at junction 504.

FIG. 6 is a top plan view of the proppant pod 100 resident within frame 200. A plurality of horizontal members 600, 602, 604 cooperate with horizontal member 210 to form a square frame 614 that is superimposed over the top 108 to form chord sections 606, 608, 610, 612, which may be welded to the top 108 for strengthening thereof. Pins 616, 618, 620, 622 may be provided to rise upwardly proximate the respective corners of frame 614 to facilitate the stacking of one such proppant pod 100 upon another. The pins 616-622 may be for example, of the type commonly used on intermodal shipping containers and may optionally be separated by standard dimensions of eight feet.

Figure 7:
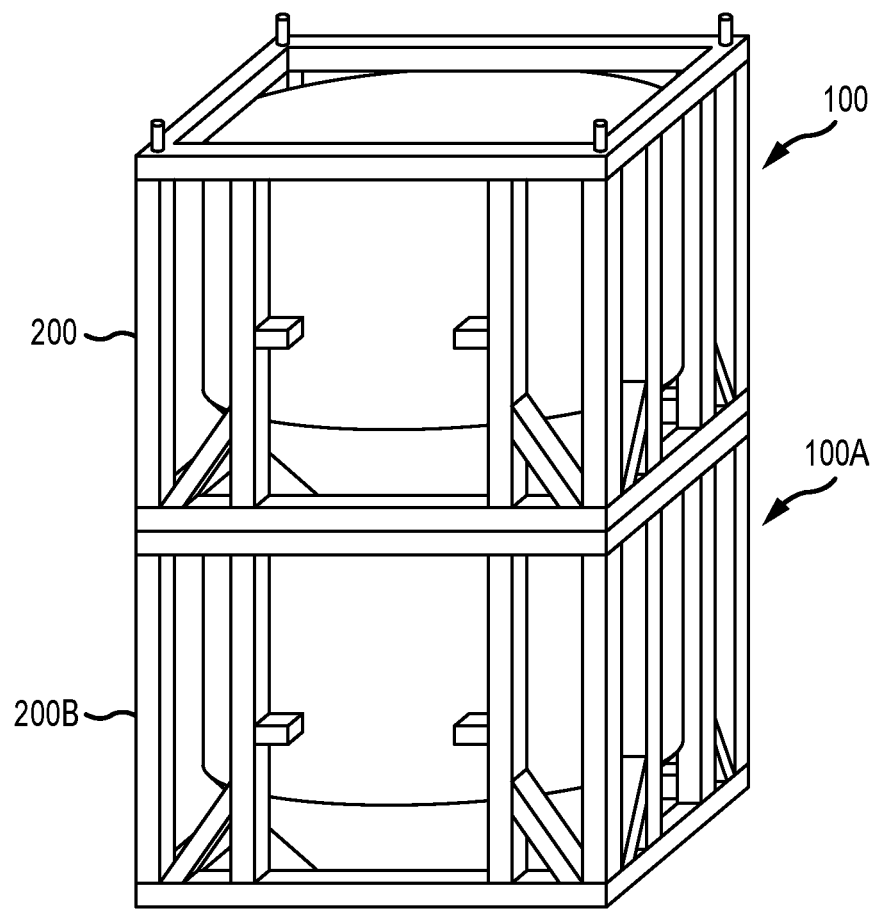
FIG. 7 shows a plurality of the proppant pods tacked one upon the other.

FIG. 7 is a top, front, right perspective view of the proppant pod 100 together with frame 200 stacked upon an identical container 100A and frame 100B.

Figure 8:
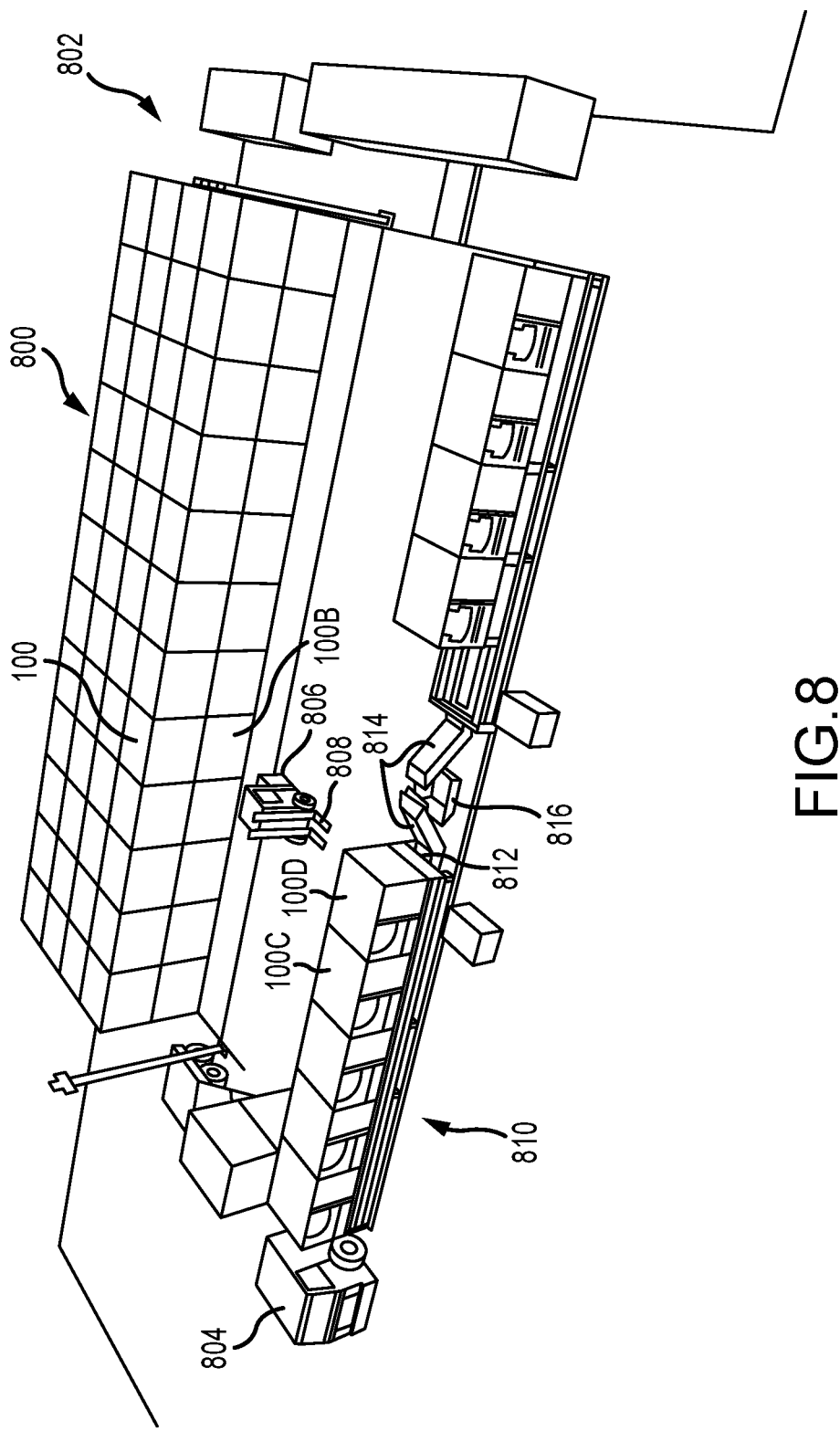
FIG. 8 shows a plurality of the proppant pods in an intended environment of use supporting a hydraulic fracturing operation at a well location.

FIG. 8 shows the filled proppant pods 100, 100B in stacked relationship among a mound 800 of similarly stacked proppant pods at a well location 802 where a hydraulic fracturing operation of being performed. The individual proppant pods 100 are preferably sized to permit over-the-road transport of two such containers at a time on a tractor/trailer 804. A forklift 806 has tongs 808 that may be inserted into the forklift tubes 218, 220 (see FIG. 2) to lift the filled proppant pod for unloading of the proppant pod from the tractor-trailer 804 for storage in the mound 800 among other proppant pods of the same construction. A similar forklift may be used to load the pods onto the tractor trailer 802 for over-road transport, for example, from a railyard or a commercial proppant supplier to the well location 802. The forklift 804 may then deposit one or more of the filled proppant pods, such as proppant pods 100C, 100D, onto conveyor sled 810. Upon actuation of the aforementioned motive means, the gate 114 of each filled proppant pod opens to discharge sand onto a belt 812, which moves the proppant to a discharge chute for eventual delivery to a blending unit that mixes the proppant with fracking fluid in support of the hydraulic fracturing operation. Once any one of the proppant pods 100 have discharged substantially all of their internal proppant onto the belt 812, the forklift 806 may be used to remove the empty proppant pod 100 from conveyor sled 810 for return to the mound 802 to await delivery of a second tractor trailer that will remove the empty proppant pod from the well location 802.

Table 1 below provides a summary of weight limits imposed by various oil-producing States:

TABLE 1

| State Weight Limits | | |
|---|---|---|
| State | Max GVW w/out Permit | Max GVW w/Permit |
| Colorado | 80,000 | 97,000 |
| Minnesota | 80,000 | 80,000 |
| Montana | 131,060 | 131,060 |
| North Dakota | 80,000 | 105,500 |
| New Mexico | 86,400 | 90,000 |
| Oklahoma | 80,000 | 90,000 |
| Ohio | 80,000 | 120,000 |
| Pennsylvania | 80,000 | 80,000 |
| Texas | 80,000 | 84,000 |
| West Virginia | 80,000 | 84,000 |
| Wisconsin | 80,000 | 80,000 |
| Wyoming | 117,000 | 117,000 |

Because federal regulations also impose weight restrictions, the presumed maximum limit nationwide is 80,000 pounds. Deducting the weight of the tractor and trailer from this maximum limit leaves a payload capacity generally in the range from 48,000 pounds to 54,000 pounds. In the case of intermodal dimensions as discussed above, a 15 ton container weighs 30,000 pounds, which precludes the hauling of two containers on a single trailer without special permitting in all of these States but Montana and Wyoming. At the same time, the 30,000 pound container weighs from 18,000 pounds to 24,000 pounds less than the presumed maximum permitted payload. It is impractical to have a single pod weighing from 48,000 to 54,000 pounds when filled with sand because this is a very heavy weight that requires specialized handling equipment and may be excessively dangerous in the intended environment of use. Even so, it is possible to reduce wastage of excess hauling capacity by constructing the pods to contain each about 20,000 pounds of sand. This permits the combined weight of the pod and sand to fall within the limits discussed above. Depending upon the type of trailer in use, weights of the filled pods may be increased by 7,000 to 8,000 pounds; however, in this regard the 20,000 limit advantageously accommodates proppants that may be have increased density relative to normal frac sand.

Figure 9:
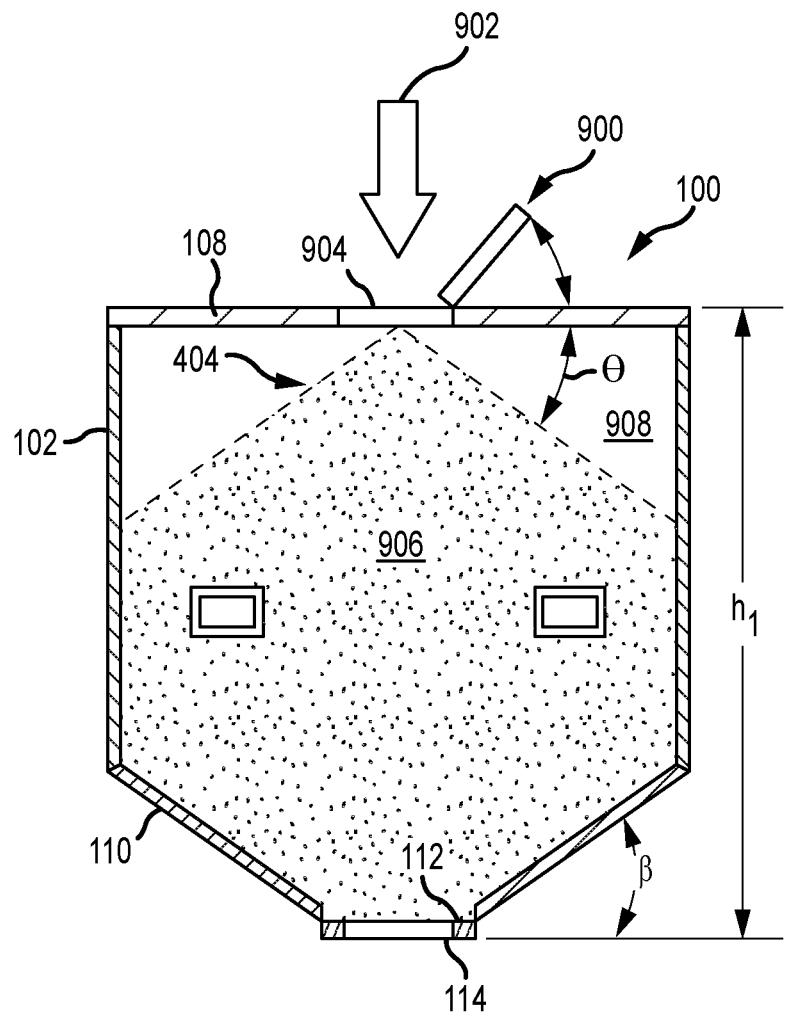
FIG. 9 is a midsectional view of the proppant pod taken along line 4-4' of FIG. 6, but without the exterior frame, and including a hatch used to fill the interior space of the proppant pod with proppant.

FIG. 9 is a midsectional view of proppant pod 100 taken along line 4-4' of FIG. 6. As shown in FIG. 9, however, a hinged top hatch 900 is provided in top 108 to permit entry of fill proppant or sand 902 through hatch opening 904. The hatch 900 may be selectively opened and closed, and may be locked in closed position. A shown in FIG. 9, the interior space 404 is partially filled with proppant or sand 906. Because the proppant 906 enters from hatch opening 904, the proppant forms an angle of repose θ. The angle of repose θ will be, generally speaking, in the range from 35° to 45° down from horizontal, which leaves a void 908 in that portion of interior space 404 residing above the proppant 906. When proppant pod 100 has an eight foot diameter, a weight of about 20,000 pounds of dry sand may be achieved utilizing an overall height $h_1$ of about seven feet. Hatch 114 is placed in a closed configuration during the fill operation.

Figure 10:
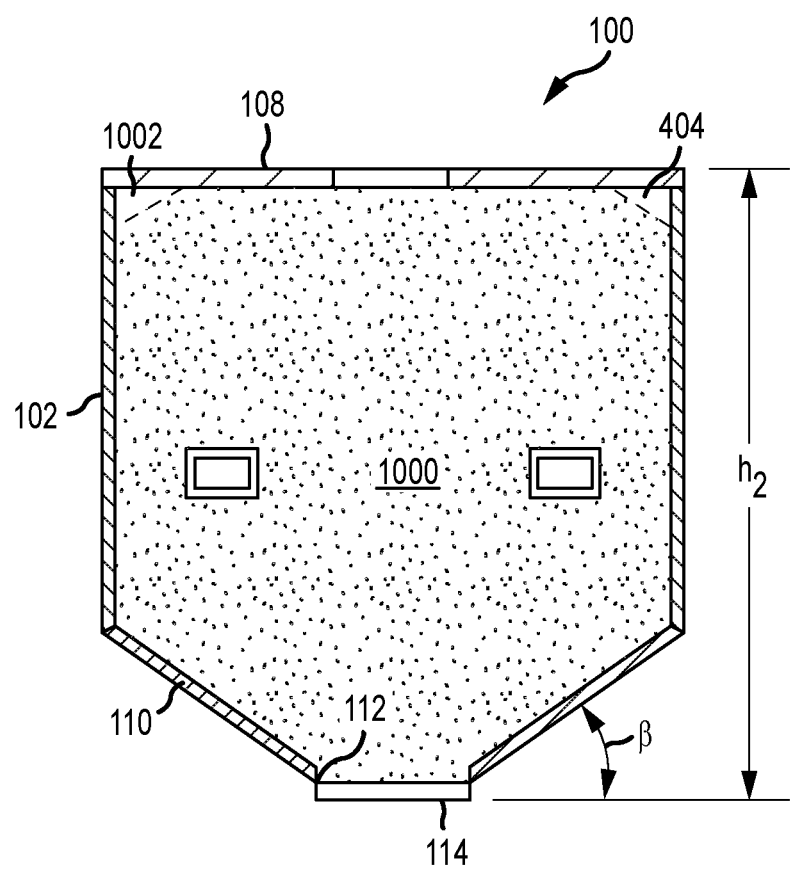
FIG. 10 is a midsectional view of the proppant pod taken along line 4-4' of FIG. 6, but without the exterior frame, and as an embodiment without a top hatch where the proppant pod is, nonetheless, filled with proppant.

FIG. 10 shows a different form of proppant to container 100 that contains proppant 1000, which has been introduced to the interior space 404 through gate 114. In this embodiment, the top 108 is solid and does not contain a hatch. The void space 1002 is much smaller than comparable void space 908 shown in FIG. 9. The void space 1002 is negligible for most purposes, but may be entirely eliminated in most situations where the angle β exceeds the natural angle of repose θ (see FIG. 9). The gate 114 is placed in the closed configuration to retain proppant when proppant pod 100 is in the configuration shown in FIG. 10. By way of example, the proppant pod 100 has an overall height of $h_2$ which, considering the constraints imposed by transportation weight limits of dual-haul of containers, may be about a foot shorter than $h_1$ with commensurate weight reduction as compared to the embodiment t of FIG. 9.

Figure 11:
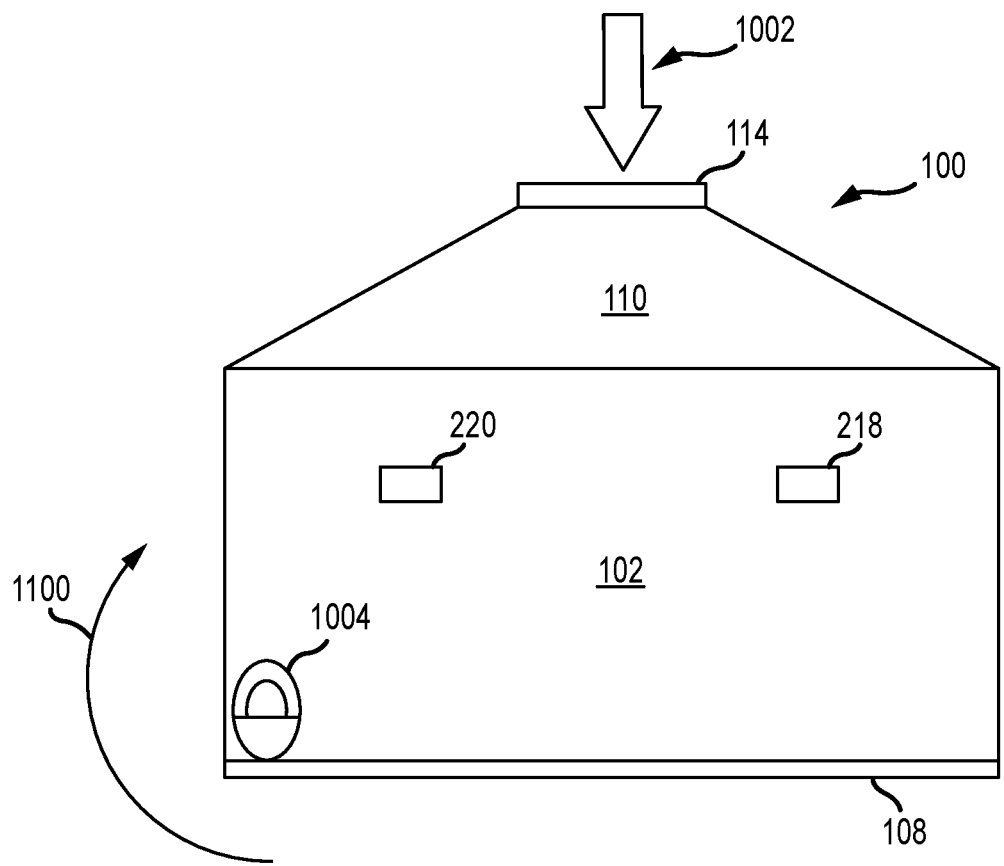
FIG. 11 is a front view of the proppant pod shown in FIG. 10 in an inverted configuration utilized for fill operations.

As shown in FIG. 11, the proppant pod 100 of FIG. 10 has been inverted by rotation 1100 to place the bottom 110 at the top of proppant pod 100 facing up. In this configuration, the gate 114 is opened for passage of incoming proppant 1002 to be received within the interior space 404. The proppant pod 100 may be inverted for filling operations by use of a forklift equipped with a rotator table as described in copending application Ser. No. 15/264,328 filed Sep. 13, 2016.

Figure 12:
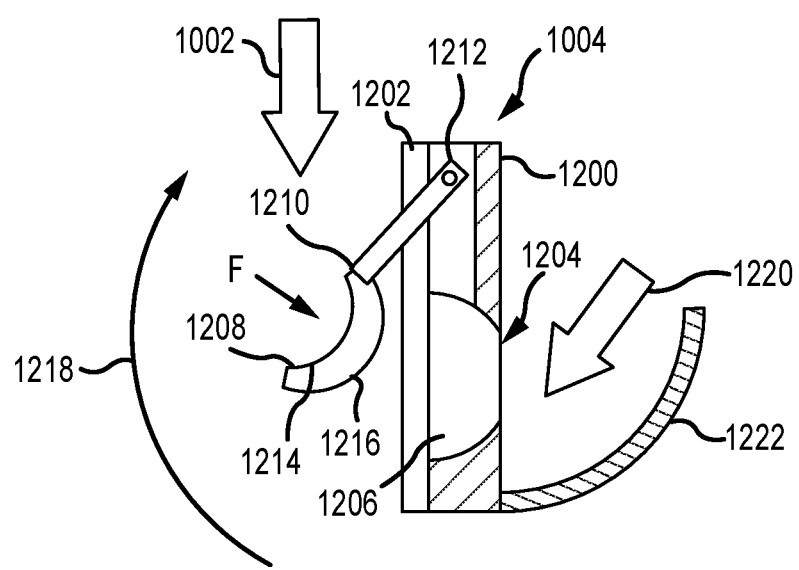
FIG. 12 shows a vent assembly utilized to balance air pressure during proppant filling and discharge operations.

An optional vent assembly 1004 is provided in cylindrical wall 102. FIG. 12 is a midsectional view of the vent assembly 1004 shown in the inverted configuration of FIG. 11. A base 1200 has a curved face 1202 complementary to the exterior of cylindrical wall 102 (see FIG. 11) to which base 1200 is welded. The base 1200 has a through passage 1204 and a valve seat 1206 sized for sealing engagement with curved element 1208, which is attached to clapper arm 1210. The clapper arm 1210 attaches to the base at pivot 1210. Incoming proppant 1002 strikes surface 1214 of the curved element 1208, exerting a force F that drives face 1216 into sealing engagement with valve seat 1206. This structure forms a check valve that prevents the discharge of proppant through passage 1204 during the fill operation. When the vent assembly 1004 is rotated 1218 for re-inversion into a normal operational configuration for the discharge of proppant, the curved element 1208 falls away from valve seat 1206 under the force of egressing air 1220 that is drawn into proppant pod 100 under the force of rapidly discharging proppant. Upon reinversion 1218, a curved rain bell 1222 covers the opening 1204 from above to prevent precipitation from contaminating the proppant by virtue of entry through passage 1204.

Those of ordinary skill in the art will appreciate that the foregoing discussion may be subjected to insubstantial changes without departing from the scope and spirit of the invention. Accordingly, the inventors hereby state their intention to rely upon the Doctrine of Equivalents if needed to protect the full scope of the invention that is claimed.

The invention claimed is:

1. A proppant pod, comprising:
   a cylindrical sidewall having a top end and a bottom end;
   a top enclosing the top end of the cylindrical sidewall;
   a frustoconical bottom covering the bottom end of the cylindrical sidewall,
   the cylindrical sidewall, top and frustoconical bottom collectively defining an interior space of the proppant pod,
   the frustoconical bottom being formed of a wall that tapers inwardly towards a discharge opening at an angle that is suitable as a means for imparting gravity flow of proppant towards the discharge opening, the means for imparting gravity flow consisting essentially of a mechanism for moving proppant through the pod;
   a gate covering the discharge opening,
   the gate being selectively positionable between an open configuration permitting gravity discharge of proppant through the discharge opening to a position directly beneath the proppant pod, and a closed configuration that prevents proppant from flowing through the discharge opening; and
   a pair of elongate forklift tubes attached to the proppant pod for lifting thereof,
   each of the forklift tubes penetrating the cylindrical sidewall in parallel orientation with respect to one another to form a fork lilt receptacle therethrough; and
   an exterior frame surrounding the proppant pod providing support for stacking one such proppant pod atop another.

2. The proppant pod of claim 1, wherein the exterior frame has a plurality of horizontal members forming a rectilinear top and a rectilinear bottom connected by a plurality of upright posts,
   the rectilinear top and rectilinear bottom having complementary dimensions for stacking one of such proppant pod upon another.

3. The proppant pod of claim 2, wherein the rectilinear top has a plurality of pins and the rectilinear bottom has a plurality of receivers to facilitate secure stacking of one of such proppant pod upon another.

4. The proppant pod of claim 2, wherein complementary dimensions of the rectilinear top and the rectilinear bottom are square.

5. The proppant pod of claim 1, further comprising motive means operatively coupled with the gate for selective positioning thereof between the open configuration and the closed configuration.

6. The proppant pod of claim 5, wherein the motive means is selected from the group consisting of a manually operated driver, a earring structure, a gearing arrangement, and an electric motor.

7. The proppant pod of claim 1, wherein the gate is a ladder gate.

8. The proppant pod of claim 1, wherein the gate is an iris gate.

9. The proppant pod of claim 1, wherein the gate is a clamshell gate.

10. The proppant pod of claim 1, further comprising a cross-bracing structure that spans the interior space.

11. The proppant pod of claim 1, wherein each of the one or more forklift tubes present an axis of elongation and at least one cross-brace of the cross-bracing structure is elongated in a direction substantially perpendicular to the axis of elongation.

12. The proppant pod of claim 1, further comprising a vent assembly located in the cylindrical sidewall to permit egress of air into and out of the interior space.

13. The proppant pod of claim 12, wherein the vent assembly is located proximate the top.

14. The proppant pod of claim 12, where the vent assembly is constructed as a check valve.

15. The proppant pod of claim 1, wherein the top include a hatch that may be selectively opened to fill the interior space with proppant.

16. The proppant pod of claim 1, wherein angle of the taper suitable for use as the means for imparting gravity flow includes the wall of the frustoconical bottom rising at an angle from horizontal ranging from 35° to 45°.

17. A proppant pod, comprising:
a cylindrical sidewall having a top end and a bottom end;
a top enclosing the top end of the cylindrical sidewall;
a frustoconical bottom covering the bottom end of the cylindrical sidewall, the cylindrical sidewall, top and frustoconical bottom collectively defining an interior space of the proppant pod,
the frustoconical bottom being formed of a wall that tapers inwardly towards a discharge opening;
a gate covering the discharge opening,
the gate being selectively positionable between an open configuration permitting proppant to flow through the discharge opening, and a closed configuration that prevents proppant from flowing through the discharge opening;
one or more elongate forklift tubes attached to the proppant pod for lifting thereof; and
a vent assembly located in the cylindrical sidewall to permit egress of air into and out of the interior space;
where the vent assembly is constructed as a check valve and;
the check valve is a clapper valve that opens on an arc travelling away from the top.

18. A proppant pod, comprising:
a cylindrical sidewall having a top end and a bottom end;
a top enclosing the top end of the cylindrical sidewall;
a frustoconical bottom covering the bottom end of the cylindrical sidewall, the cylindrical sidewall, top and frustoconical bottom collectively defining an interior space of the proppant pod,
the frustoconical bottom being formed of a wall that tapers inwardly towards a discharge opening;
a gate covering the discharge opening,
the gate being selectively positionable between an open configuration permitting proppant to flow through the discharge opening, and a closed configuration that prevents proppant from flowing through the discharge opening;
one or more elongate forklift tubes attached to the proppant pod for lifting thereof; and
a vent assembly located in the cylindrical sidewall to permit egress of air into and out of the interior space,
where the vent assembly includes a rain bell operably positioned to mitigate entry of precipitation into the interior space.

19. A method of filing a proppant pod with proppant by use of a forklift equipped with forklift tongs and a rotary table for the forklift; the method comprising:
providing a proppant pod according to claim 1;
inserting the forklift tongs into the pair of elongate forklift tubes of the proppant pod;
lifting the proppant pod by raising the forklift tongs;
inverting the proppant pod by rotation of the rotary table into a configuration such that the gate faces up;
opening the gate to permit passage of proppant therethrough;
with the gate in the open configuration, introducing proppant into the interior space of the proppant pod;
with proppant residing in the interior space, closing the gate, and
thereafter rotating the proppant pod into a configuration such that the gate faces down.

20. The method of claim 19 wherein the interior space is substantially completely filled with proppant.

21. A filled proppant pod produced according to the method of claim 19.

22. A method of hydraulic fracturing that comprises:
providing a proppant pod according to claim 1;
filling the proppant pod with proppant to provide a filled proppant pod;
loading the filled proppant pod onto a first trailer for over-road transport;
transporting the filled container on the first trailer to a well location;
at the well location, unloading the filled proppant pod from the first trailer;
placing the filled proppant pod onto a conveyor sled;
discharging proppant from the filled proppant pod onto the conveyor sled to provide proppant in support of a hydraulic fracturing operation to provide an empty proppant pod;
removing the empty proppant pod from the conveyor sled; and
placing the empty proppant pod onto a second trailer for removal from the well location.

23. The method of hydraulic fracturing according to claim 22, further comprising a step of:
at the well location, placing the filled proppant pod into a storage stack in a configuration such that the proppant pod resides atop the exterior frame of another such proppant pod.

24. The method of claim 23, further comprising a step of:
at the well location, placing the empty proppant pod into a storage stack in a configuration such that the proppant pod resides atop the exterior frame of another such proppant pod.

25. A proppant pod, comprising:
a cylindrical sidewall having a top end, a bottom end, and a diameter of approximately eight feet;
a top enclosing the top end of the cylindrical sidewall;
a frustoconical bottom covering the bottom end of the cylindrical sidewall,
the cylindrical sidewall, top and frustoconical bottom collectively defining an interior space of the proppant pod,
the frustoconical bottom being formed of a wall that tapers inwardly towards a discharge opening at an angle that is suitable as a means for imparting gravity flow of proppant towards the discharge opening, the means for imparting gravity flow consisting essentially of the mechanism for moving proppant through the pod;
a gate covering the discharge opening,
the gate being selectively positionable between an open configuration permitting gravity discharge of proppant through the discharge opening to a position directly beneath the proppant pod, and a closed configuration that prevents proppant from flowing through the discharge opening; and
one or more elongate forklift tubes attached to the proppant pod for lifting thereof,
each of the forklift tubes penetrating the cylindrical sidewall to form a fork lift receptacle therethrough; and
an exterior frame surrounding the proppant pod providing support for stacking one such proppant pod atop another,
the cylindrical sidewall, the top, the frustoconical bottom and the gate defining an interior space that is sized to contain from 20,000 to 28,000 pounds of sand when filled with sand.

* * * * *

UNITED STATES PATENT AND TRADEMARK OFFICE
CERTIFICATE OF CORRECTION

PATENT NO. : 10,618,724 B2
APPLICATION NO. : 15/455796
DATED : April 14, 2020
INVENTOR(S) : Marc Kevin Fisher et al.

It is certified that error appears in the above-identified patent and that said Letters Patent is hereby corrected as shown below:

In the Specification

Column 3, Line 51 the text "pods tacked" should be --pods stacked--

Column 3, Lines 5-59 the text "FIG. 9 is a midsectional view of the proppant pod taken along Line 4-4' of FIG. 6, but without the exterior frame, and as an embodiment including a top hatch used to fill the interior space of the proppant pod with proppant;" should be deleted Column 4, Line 31 the text "front showing" should be --front view showing--

Column 4, Line 55 the text "304c\work" should be --304 work--

Column 5, Line 12 the text "4500" should be --400--

Column 5, Line 44 the text "be for" should be --be, for--

Column 6, Line 38 the text "permitting" should be --permit--

Column 6, Line 60 the text "A shown" should be --As shown--

In the Claims

Column 8, Claim 6, Line 41 the test "earring" should be --camming--

Column 10, Claim 25, Line 58 the text "fork lift" should be --forklift--

Signed and Sealed this
Twelfth Day of July, 2022

Katherine Kelly Vidal
*Director of the United States Patent and Trademark Office*